US012797782B2

(12) United States Patent
Yang et al.

(10) Patent No.: US 12,797,782 B2
(45) Date of Patent: Nov. 17, 2026

(54) AIR PURIFIER

(71) Applicant: Shenzhen Antop Technology Co., Ltd., Shenzhen (CN)

(72) Inventors: Ruidian Yang, Shenzhen (CN); Chu Yan, Shenzhen (CN)

(73) Assignee: SHENZHEN ANTOP TECHNOLOGY CO., LTD., Shenzhen (CN)

( * ) Notice: Subject to any disclaimer, the term of this patent is extended or adjusted under 35 U.S.C. 154(b) by 26 days.

(21) Appl. No.: 19/252,560

(22) Filed: Jun. 27, 2025

(65) Prior Publication Data

US 2026/0249223 A1 Aug. 27, 2026

(30) Foreign Application Priority Data

Feb. 27, 2025 (CN) ......................... 202520333007.9
Mar. 25, 2025 (CN) ......................... 202520537147.8

(51) Int. Cl.
*B01D 46/00* (2022.01)
*A01K 15/02* (2006.01)
*B01D 46/10* (2006.01)
*F24F 1/0328* (2019.01)
*F24F 8/108* (2021.01)

(52) U.S. Cl.
CPC .......... *B01D 46/103* (2013.01); *A01K 15/024* (2013.01); *F24F 1/0328* (2019.02); *F24F 8/108* (2021.01)

(58) Field of Classification Search
CPC ... B01D 46/103; A01K 15/024; F24F 1/0328; F24F 8/108
USPC .......................................................... 55/385.1
See application file for complete search history.

(56) References Cited

U.S. PATENT DOCUMENTS

| | | | | |
|---|---|---|---|---|
| 4,803,953 | A * | 2/1989 | Graves ................. | A01K 15/025 124/16 |
| 5,505,161 | A * | 4/1996 | Swendseid ........... | A01K 15/025 446/227 |
| 6,591,785 | B1 * | 7/2003 | Boshears ............. | A01K 15/024 119/706 |
| 10,477,837 | B1 * | 11/2019 | Liu ...................... | A01K 15/025 |
| 2002/0189549 | A1 * | 12/2002 | Writer .................. | A01K 15/024 119/706 |
| 2006/0213572 | A1 * | 9/2006 | Beaulieu ............... | F16L 59/166 138/155 |
| 2007/0245975 | A1 * | 10/2007 | Udelle ................. | A01K 13/004 119/600 |

(Continued)

*Primary Examiner* — T. Bennett Mckenzie
(74) *Attorney, Agent, or Firm* — MUNCY, GEISSLER, OLDS & LOWE, P.C.

(57) ABSTRACT

An air purifier includes a purifier body and an amusing arrangement provided on the purifier body for interacting with a pet, where at least one hole is formed in the amusing arrangement, the amusing arrangement is provided with a driver and an amusing assembly connected with the driver, and the driver is configured to drive the amusing assembly to move and allow the amusing assembly to extend out of or retract into the hole. By arranging the amusing arrangement, an interesting interactive experience is provided for the pet, encouraging the pet to actively approach and linger near the air purifier. Such configuration increases the chances that pet hair is adsorbed and filtered, enabling timely removal of the pet hair by the air purifier and reducing accumulation, and thus improving the cleaning effect.

20 Claims, 11 Drawing Sheets

(56) References Cited

U.S. PATENT DOCUMENTS

| | | | | |
|---|---|---|---|---|
| 2008/0104785 A1 * | 5/2008 | Robinson | A46B 3/16 | |
| | | | 15/207.2 | |
| 2024/0032509 A1 * | 2/2024 | Diskin | A01K 15/024 | |

* cited by examiner

AIR PURIFIER

CROSS REFERENCE TO RELATED APPLICATIONS

The present application claims priorities from Chinese Application No. CN 202520333007.9 filed on Feb. 27, 2025, and Chinese Application No. CN 202520537147.8 filed on Mar. 25, 2025, all of which are hereby incorporated herein by reference.

TECHNICAL FIELD

The present disclosure relates to the field of household appliances, and in particular, to an air purifier.

BACKGROUND

With the development of society and the improvement of people's living standards, keeping pets at home has become increasingly popular, especially pet cats and dogs, which have become common household pets. However, while bringing companionship and joy to people, the pets also bring some troubles in daily life, among which the most prominent being pet hair shedding. Pet hair may scatter in various corners of indoor spaces, affecting home cleanliness, and may also carry bacteria, allergens, etc., posing a potential threat to the health of dwellers. An air purifier, as a common household cleaning device, may be used to absorb and filter pet hair in the air. However, the current air purifier available on the market lack features for interaction with the pets except being focusing on air purification function, which limits its ability to attract pets close enough for timely pet hair collection, resulting in the accumulation of pet hair and reduced cleaning effect.

SUMMARY

Therefore, the present disclosure provides an improved air purifier, including a purifier body and an amusing arrangement provided on the purifier body for interacting with a pet, where at least one hole is formed in the amusing arrangement, the amusing arrangement is provided with a driver and an amusing assembly connected with the driver, and the driver is configured to drive the amusing assembly to move and allow the amusing assembly to extend out of or retract into the hole.

By arranging the amusing arrangement, the air purifier of the present disclosure newly introduces an interactive function with the pets, which enhances their enjoyment and helps to alleviate their anxiety. The air purifier also allows the pets to expend excess energy, achieving multifunctional use with a single device. Meanwhile, by providing an interesting interactive experience, the pet is attracted to actively approach linger near the air purifier, thereby increasing the chances that hair is adsorbed and filtered. This allows the air purifier to clean pet hair in time, reducing accumulation, and thus improving the cleaning effect.

Another aspect of the present disclosure provides an air purifier provided with a scratching portion, which can meet the daily scratching needs of the pets, and further encourages the pets to spend more time around the air purifier. During the scratching process, loose or shedding hair and dander attached to the pets are scraped and then absorbed by the air purifier for timely cleaning, thereby further enhancing the purification function.

DETAILED DESCRIPTION OF THE EMBODIMENTS

Figure 1:
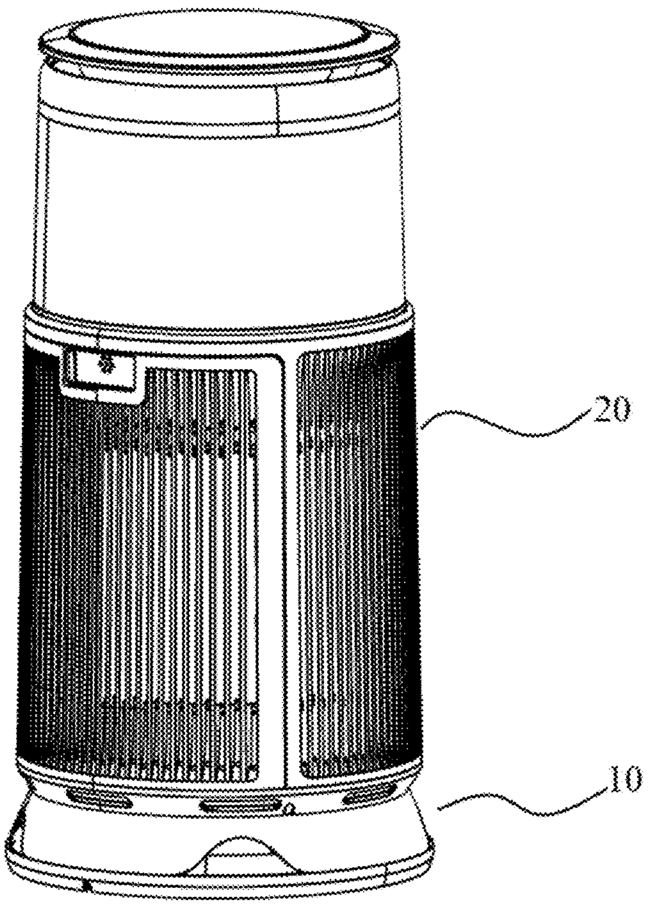
FIG. 1 is a perspective view of an air purifier according to an embodiment of the present disclosure, with an amusing arrangement being arranged at the bottom of the air purifier.

The accompanying drawings of the present disclosure are only intended for illustrative purposes and should not be construed as limiting the present disclosure. In order to better illustrate the following embodiments, some components in the accompanying drawings may be omitted, enlarged or reduced in size and do not represent actual product dimensions of a product. It is understandable to those having ordinary skill in the art that certain well-known structures in the accompanying drawings and their descriptions may be omitted.

In the drawings, identical or similar features are labelled with the same reference numerals in different embodiments.

Figure 2:
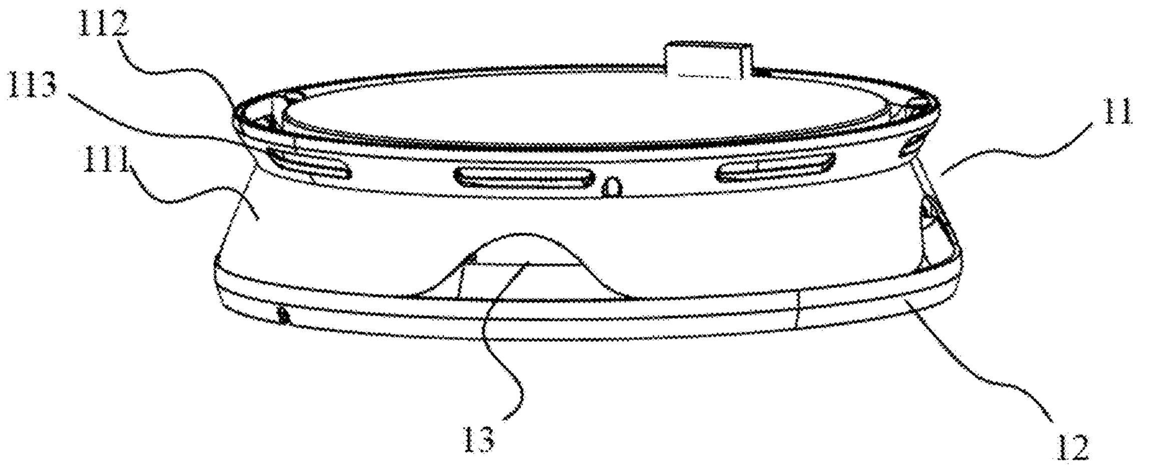
FIG. 2 is a perspective view of the amusing arrangement of the air purifier of FIG. 1.
Figure 3:
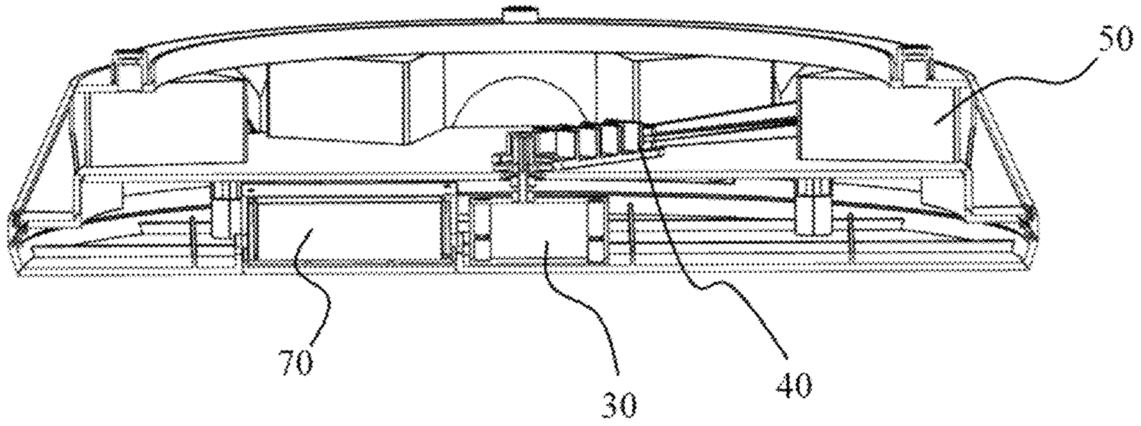
FIG. 3 is a sectional view of the amusing arrangement in FIG. 2.

FIG. 1 shows an air purifier according to an embodiment of the present disclosure, including a purifier body 20 and an amusing arrangement 10 provided on the purifier body 20. FIG. 2 and FIG. 3 show a specific structure of the amusing arrangement 10 according to an embodiment of the present disclosure. In this embodiment, at least one hole 13 is formed in the amusing arrangement 10, a driver 30 and an amusing assembly 40 connected with the driver 30 are arranged in the amusing arrangement 10, and the driver 30 drives the amusing assembly 40 to move so as to allow the amusing assembly 40 to extend out of or retract into the hole 13.

By providing the amusing arrangement 10 on the purifier body 20, the air purifier gains an interactive function with pets, helping to alleviate their anxiety and allowing them to expend excess energy. Particularly, the amusing arrangement 10 is provided with the amusing assembly 40 and the hole 13 associated with the amusing assembly 40. Therefore, when the driver 30 is activated, the amusing assembly 40 may extend out of or retract into the hole 13 at random under the driving of the driver 30, thereby attracting the attention of the pets. This encourages the pets to chase and paw at the amusing assembly 40, adding fun to their daily routine and enhancing the interactivity between the air purifier and the pets, thus achieving multifunctional use with a single device. Meanwhile, by providing an interesting interactive experience, the pet is attracted to actively approach and linger near the air purifier, which increases the chances that pet hair is adsorbed and filtered. This allows the air purifier to clean pet hair in time, reducing accumulation of pet hair, and thus improving the cleaning effect.

Figure 4:
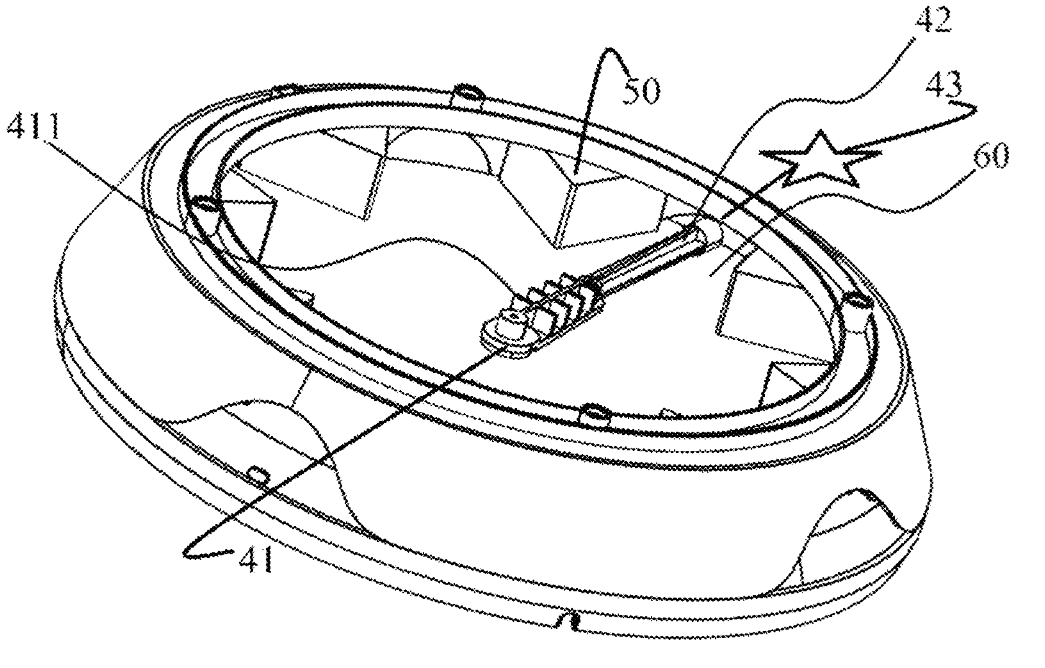
FIG. 4 is a partial perspective view of the amusing arrangement of the air purifier in FIG. 1, with a top structure of the amusing arrangement being removed.

Referring now to FIG. 4, according to a preferred embodiment of the present disclosure, the amusing assembly 40 particularly includes a driving arm 41 rotatably connected with the driver 30 and a driven arm 42 rotatably connected with the driving arm 41. In particular, the driver 30 may be a motor. When activated, the motor drives the driving arm 41 to swing, and in turn the driving arm 41 drives the driven arm 42 to swing. Driven by the motor, the driving arm 41 and the driven arm 42 may realize states such as extension in a straight line, angled, or overlapping. As a result, when the driving arm 41 and the driven arm 42 are aligned in a straight or nearly straight line, a free end of the driven arm 42 extends out of the hole 13. Conversely, when the driving arm 41 and the driven arm 42 overlap or form a significant angle, the free end of the driven arm 42 retracts into the hole 13. The attention of the pet is attracted through extending or retracting movement of the driven arm 42.

According to another more preferred embodiment, in order to reduce the friction caused by the collision between the amusing assembly 40 and other components during movement, at least the driven arm 42 is designed as an elastic arm. The elastic arm may rebound and change its swing direction upon colliding with other components, and meanwhile, the elastic arm may prolong the service life of the product, and also increase the enjoyment for the pets during play. Particularly, the elastic arm may be made of plastic materials. In other implementations, the elastic arm may realize an elastic effect in a way that the driven arm 42 is rotatably connected with the driving arm 41 through a spring.

In order to better fit playful habits of the pets, the amusing assembly 40 in this embodiment further includes an amusing element 43 arranged at an end of the driven arm 42 away from the driving arm 41. The attention of the pets may be better attracted by arranging the amusing element 43, thus enhancing the interactivity between the air purifier and the pets.

Preferably, the amusing element 43 may be a feather, a hairball, a ribbon, a bell, or the like.

In addition, due to susceptibility to wear and tear of the amusing element 43, according to a more preferred embodiment of the present disclosure, the amusing element 43 is detachably connected with the driven arm 42. Such configuration allows the amusing element 43 to be replaced in time when it becomes worn out. In order to realize the detachable mounting of the amusing element 43, preferably, the free end of the driven arm 42 is provided with an insertion opening, the amusing element 43 is provided with an insertion post, so that the amusing element 43 and the driven arm 42 are detachably connected in an insertion mode.

As shown in FIG. 4, according to a preferred embodiment of the present disclosure, a guide block 50 for guiding the movement of the amusing assembly 40 may also be arranged in the amusing arrangement 10. By arranging the guide block 50, a swing angle of the driven arm 42 of the amusing assembly 40 may be limited to a certain extent, which increases the probability that the amusing assembly 40 extends out of the hole 13, thereby better attracting the attention of the pets, and further enhancing the interactivity with the pets.

More preferably, at least two guide blocks 50 may be provided, two adjacent guide blocks 50 form a guide slot 60, and the hole 3 is preferably arranged corresponding to the guide slot 60. Particularly, in this embodiment, the guide blocks 50 are arranged in a triangular or quasi-triangular shape. In such configuration, the width of the guide slot 60 formed by two adjacent guide blocks 50 gradually narrows in a direction pointing to the hole 13, forming a better guiding effect.

With regard to the elastic driven arm 42, when being in contact with the guide block 50, it may rebound and change its swing direction, preventing wear caused by rigid collision between the driven arm 42 and the guide block 50, thereby prolonging the overall service life of the amusing arrangement 10.

According to a preferred embodiment of the present disclosure, in order to improve the strength of the driving arm 41 and thus prolong the service life of the amusing assembly 40, the driving arm 41 is provided with reinforcing ribs 411.

Returning to FIG. 2, a plurality of holes may be preferably formed, which are circumferentially distributed along the periphery of the amusing arrangement 10.

For a relatively small air purifier, the plurality of holes 13 distributed along the periphery of the amusing arrangement 10 allow the amusing assembly 40 to extend out from all around, which further enhances the interactivity between the air purifier and the pets. For a relatively large air purifier, because the pets have a limited field of vision and the large air purifier may need to be placed against a wall, it may not be required to uniformly distribute holes 13 all around. Instead, at least one hole 13 may be selectively provided only in a certain section of the amusing arrangement 10 associated with the amusing assembly 40.

In this case, an output shaft of the motor preferably coincides with the center of a circle of the plurality of circumferentially distributed holes 13, and the output shaft of the motor is arranged at the center of a circle surrounded by the plurality of holes 13, so that when the motor is activated, the amusing assembly 40 may smoothly extend out from all around.

Referring to FIG. 3, according to a preferred embodiment of the present disclosure, the amusing arrangement 10 may also be provided with a battery slot 70 electrically connected with the driver 30. With a battery installed in the battery slot 70, the driver 30 is powered without plugged in a power cord, so that the air purifier is allowed to be placed freely according to actual usage needs. Moreover, because the battery slot 70 of the amusing arrangement 10 can come with its own power supply, the amusing arrangement 10 may serve as an independent accessory for the air purifier. For example, when used as a base of the air purifier, the amusing arrangement 10 may be powered by an independent power supply, and may also be detached and used alone.

Figure 6:
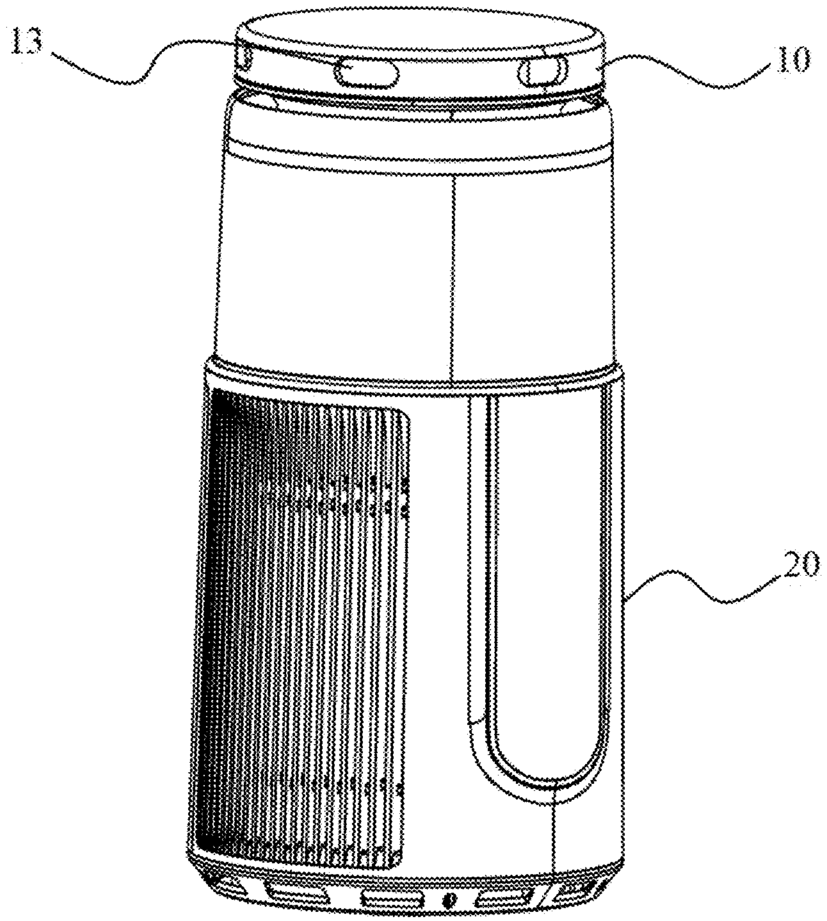
FIG. 6 is a perspective view of an air purifier according to an embodiment of the present disclosure, with an amusing arrangement being arranged at the top of the air purifier.

According to the present disclosure, the amusing arrangement 10 may be arranged at the bottom of the purifier body 20, as shown in FIG. 1, or may be arranged at the top of the purifier body 20, as shown in FIG. 6. In a case where the amusing arrangement 10 is arranged at the bottom of the purifier body 20, the amusing arrangement 10 also serves as the base of the purifier body 20 to support the purifier body 20. It is conceivable that in other embodiments, the amusing arrangement 10 may be arranged at any position between the bottom and the top of the purifier body 20, or the amusing arrangement 10 may be arranged at a plurality of different positions of the purifier body 20 simultaneously.

Figure 5:
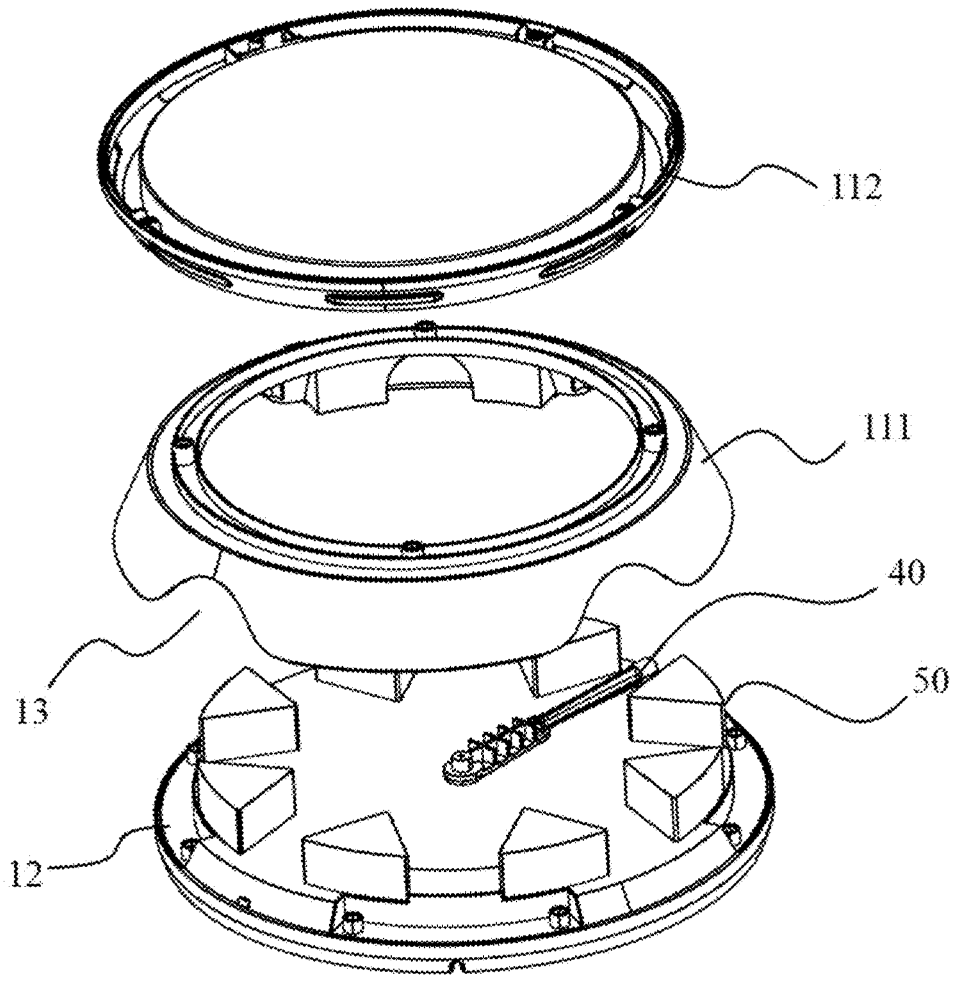
FIG. 5 is an exploded view of the amusing arrangement of the air purifier in FIG. 1.

In conjunction with FIG. 2 and FIG. 5, according to a preferred embodiment of the present disclosure, the amusing arrangement 10 particularly includes a bottom base 12 and an upper cover 11 snapped onto the bottom base 12. The hole 13 is preferably formed by snapping the bottom base 12 and the upper cover 11 together. In other implementations, the hole 13 may also be directly formed in the bottom base 12 or directly formed in the upper cover 11, which is not formed by snapping, thereby simplifying processing.

The upper cover 11 preferably includes an annular housing 111 covering the bottom base 2 and engaged with the bottom base 2 to form the hole 13, and a mounting frame 112 arranged at the top of the annular housing 111. The hole 13 is formed in an annular side wall of the annular housing 111, and the mounting frame 112 is arranged to facilitate the mounting of the purifier body 20 onto the amusing arrangement 10 and thus provides a mounting support surface for the purifier body 20.

According to a preferred embodiment of the present disclosure, the amusing arrangement 10, preferably the upper cover 11, is provided with an air vent 113 communicated with the purifier body 20 and the external air. More preferably, the air vent 113 is provided in the mounting frame 112. The purification capability of the air purifier may be enhanced and optimized by providing the air vent 113, which is especially advantageous for the case where the amusing arrangement 10 is arranged at the bottom of the purifier body 20. When the air purifier is activated, not only can the floating pet hair in the air be absorbed through air inlets in the purifier body 20, but also the pet hair or hair agglomeration on the ground can be collected through the air vent 113 in the mounting frame 112, because the amusing arrangement 10 is arranged at the bottom of the purifier body 20 and is closer to the ground. The hair or hair agglomeration is finally absorbed onto the filter screen in the purifier body 20. Such configuration enhances and optimizes the capability of collection and purification of the pet hair and hair agglomeration that fall onto the ground.

In the embodiment as shown in FIG. 6, the amusing arrangement 10 is arranged at the top of the purifier body 20. When the amusing arrangement 10 operates, the pets may jump up to interact with it, help the pets to better expend excess energy. In addition, the pets may also sit or crouch on the top of the air purifier to interact with the amusing arrangement 10.

According to an embodiment of the present disclosure, an engaging element detachably engaged with the amusing arrangement 10 may be arranged at either the top or the bottom of the purifier body 20. This allows the amusing arrangement 10 to be assembled at the bottom or the top of the purifier body 20 depending on different needs and preferences of users.

Figure 7:
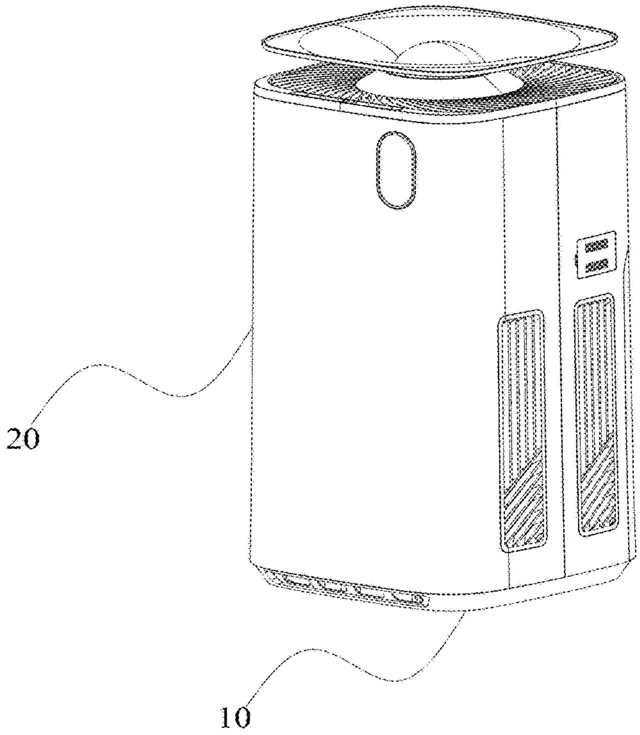
FIG. 7 is a perspective view of an air purifier according to an embodiment of the present disclosure, with a purifier body being provided with a scratching portion.
Figure 8:
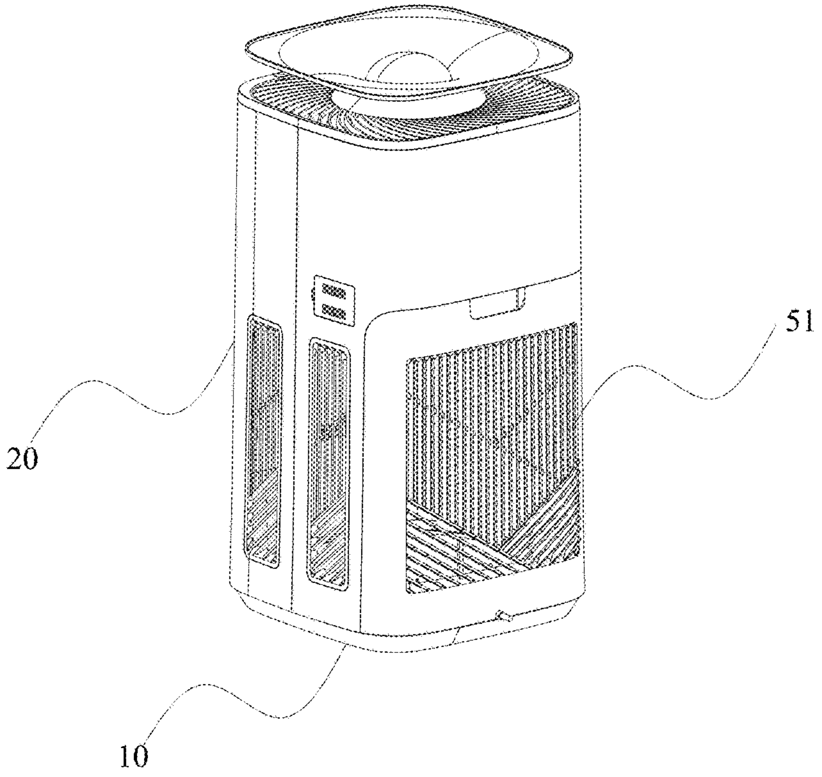
FIG. 8 is a perspective view from another angle of the air purifier shown in FIG. 7, illustrating the scratching portion.

FIG. 7 and FIG. 8 depict an air purifier according to an preferred embodiment of the present disclosure. In this embodiment, in order to meet the daily scratching needs of the pet and further enhance the interactivity between the air purifier and the pet, so as to encourage the pets to spend more time near the air purifier and further enhance and optimize the purification capability of the air purifier, the purifier body 20 may be provided with a scratching portion 51 which is configured as a protruding structure. The protruding structure rubs against the hair or skin of the pet to provide a scratching effect, while scraping off loose or shedding hair and dander attached to the body of the pet, which are finally absorbed by the air purifier, thereby ensuring timely removal of the pet hair.

Figure 9:
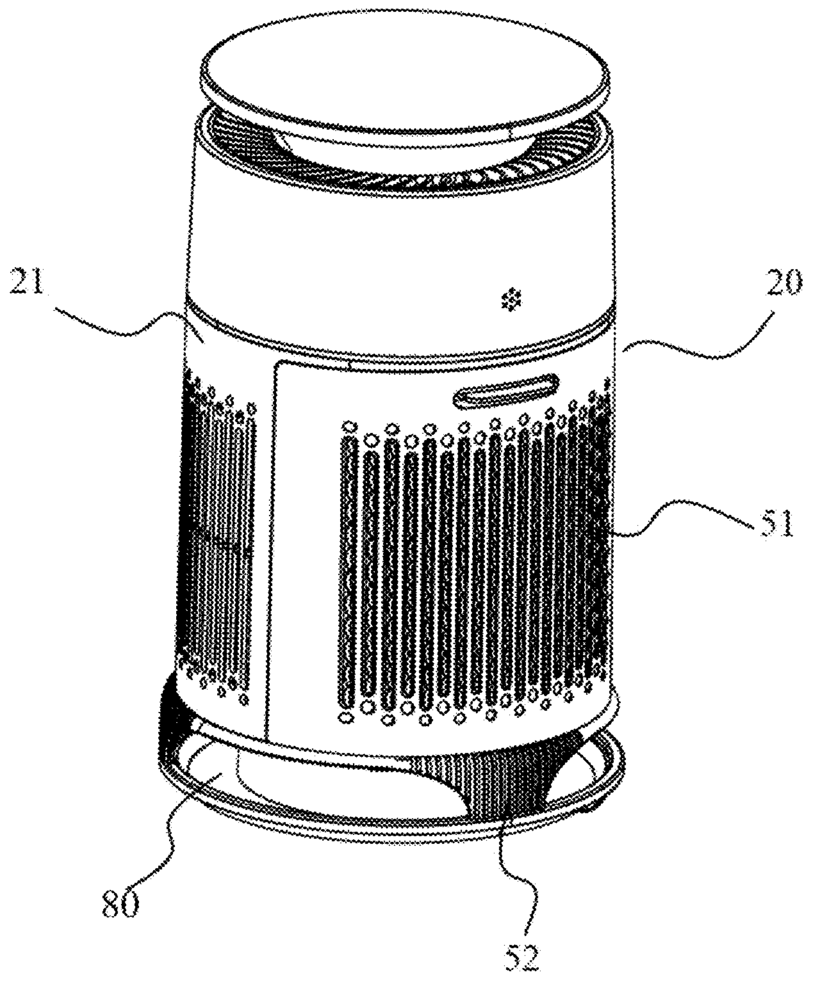
FIG. 9 is a perspective view of an air purifier according to an embodiment of the present disclosure, where the air purifier includes a separate base, and the amusing arrangement is omitted in this view for the sake of clarity.
Figure 12:
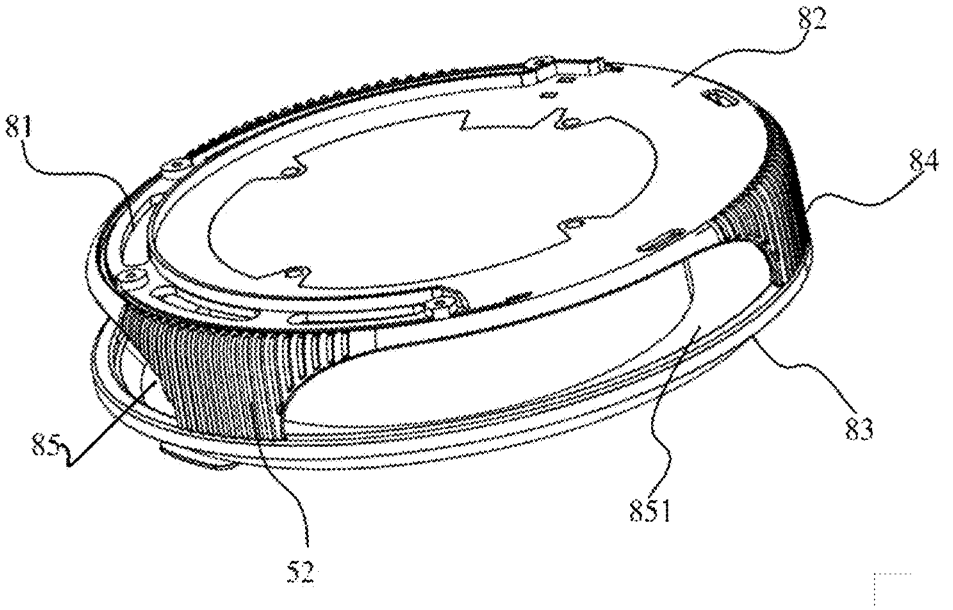
FIG. 12 is a perspective view of the base of the air purifier shown in FIG. 9.

FIG. 9 illustrates an air purifier according to another embodiment of the present disclosure. In addition to the amusing arrangement 10 serving as the base, the air purifier may also be provided with a separate base 80, especially for a case where the amusing arrangement 10 is arranged at the top of the air purifier body 20 or at any position between the top and the bottom. The purifier body 20 is arranged on the base 80, the amusing arrangement 10 may be arranged at the top of the purifier body 20, the base 80 may be provided with an engaging element detachably engaged with the amusing arrangement 10, or the amusing arrangement 10 may also be arranged between the base 80 and the purifier body 20 or at any position between the top and the bottom of the purify body 20. For the sake of clarity, in the air purifier of the present embodiment, the amusing arrangement 10 is not shown. In order to enable the base 80 of the purifier to collect and purify pet hair or hair agglomeration that fall onto the ground, the base 80 may be provided with an air vent 81 (as shown in FIG. 12) communicated with both external air and the purifier body 20. Through the air vent 81, pet hair close to the ground may be adsorbed, thereby enhancing and optimizing the purification capability of the air purifier. Additionally or alternatively, at least one of the base 80 and the purifier body 20 is provided with a scratching portion 51, 52 to meet the daily scratching needs of the pet. Such configuration can further enhance the interactivity between the air purifier and the pet, further encourage the pets to spend more time near the air purifier, and thus further enhance and optimize the purification capability of the air purifier.

As shown in FIG. 9, according to a preferred embodiment of the present disclosure, both the air purifier body 20 and the base 80 are provided with a scratching portion. The scratching portion of the purifier body 20 is denoted as a first scratching portion 51, while the scratching portion of the base 80 is denoted as a second scratching portion 52. Both the first scratching portion 51 and the second scratching portion 52 are of protruding structures. The protruding structures rub against pet hair or skin to provide a scratching effect. In other embodiments, only the air purifier body 20 may be provided with the first scratching portion 51.

According to a preferred embodiment of the present disclosure, the maximum protruding height of the first scratching portion 51 may be greater than that of the second scratching portion 52, in other words, the scratching intensity of the first scratching portion 51 is higher than that of the second scratching portion 52. This allows the first scratching portion 51 to meet the daily scratching needs of the pets, encourage the pets to spend more time near the air purifier. The second scratching portion 52 may meet the low-intensity scratching needs of the pets, for example, to scrape off loose or shedding pet hair. The scraped-off hair is then absorbed immediately by the air purifier immediately, further enhancing the purification effect.

In particular, the first scratching portion 51 may include a plurality of wavy raised lines or rack-shaped raised lines or columnar protrusions arranged in sequence. This configuration allows for a plurality of protruding end faces in the scratching portion to rub against the pet hair and skin, enhancing the scratching effect.

Because the second scratching portion 52 is designed to provide a low-intensity scratching function, the second scratching portion 52 may include a plurality of smooth raised lines, such as linear raised lines, arranged in sequence. The raised areas of the smooth raised lines are relatively flat with minimal variation, and are only used for scraping off the hair that is about to shed or has already shed from the pet. It is conceivable that wavy raised lines may also be used in other implementations.

Figure 10:
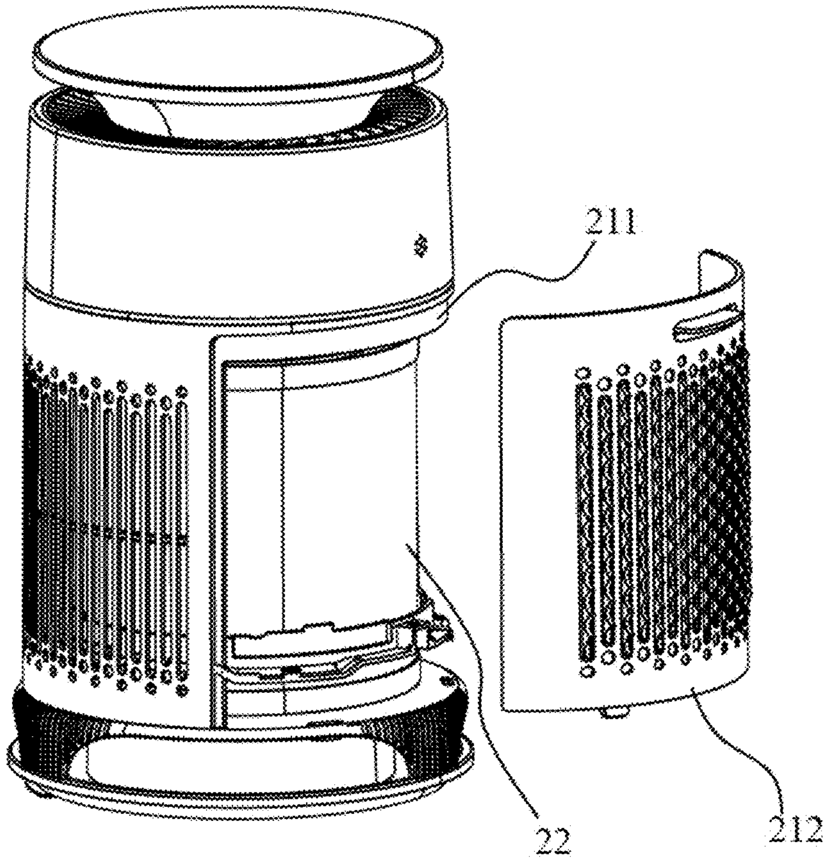
FIG. 10 is a partial exploded view of the air purifier in FIG. 9, illustrating an inner structure of the air purifier.

FIG. 10 is a partial exploded view of the air purifier shown in FIG. 9. The purifier body 20 particularly includes a housing 21 and a filter screen 22 arranged in the housing 21, where the filter screen 22 communicates with the air vent 81. During interaction with the pet, the scratching portions may stick the hair or scurf that is about to shed. When the air purifier is activated, the pet hair or hair agglomeration on the ground may be collected to the filter screen 22 through the air vent 81.

Figure 11:
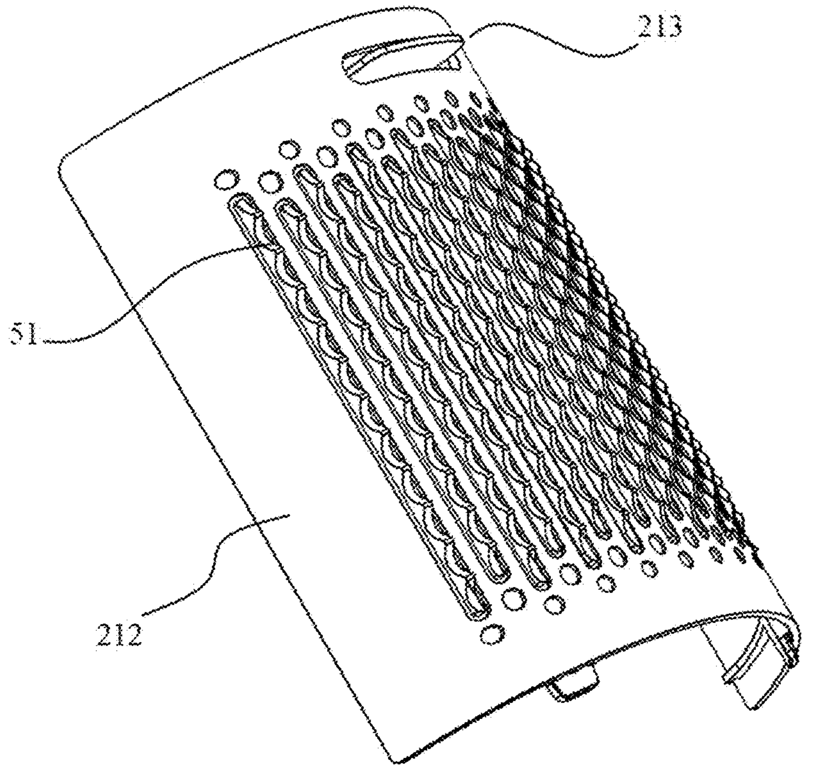
FIG. 11 is a schematic structural diagram of a surrounding plate of a purifier body of the air purifier shown in FIG. 9.

In conjunction with FIG. 10 and FIG. 11, the housing 21 particularly includes a base frame 211 and a surrounding plate 212 detachably engaged with the base frame 211. The first scratching portion 51 is arranged on the surrounding plate 212, and the surrounding plate 212 is engaged with the base frame 211 to form a closed space for accommodating the filter screen 22. The detachable connection between the surrounding plate 212 and the base frame 211 allows for easy cleaning and washing of the surrounding plate 212 when a significant amount of pet hair has accumulated on the first scratching portion 51, which achieves convenient maintenance without affecting the normal use of the air purifier.

Preferably, the surrounding plate 212 is engaged with the base frame 211 by a snap-fit fastener, and a handle 213 is arranged at a position, corresponding to the snap-fit fastener, on the surrounding plate 212, which is convenient for the snap-fit fastener to be engaged and disengaged.

FIG. 12 shows the base 80 of the air purifier according to an embodiment of the present disclosure. The base 80 includes an upper base 82 and a lower base 83 arranged below the upper base 82, where the air vent 81 is formed in the upper base 82. An outer edge of the upper base 82 extends downward to the lower base 83 to form an extension portion 84, that is, the extension portion 84 is located between the upper base 82 and the lower base 83. The second scratching portion 52 is formed on the outer wall of the extension portion 84. Preferably, the upper base 82 is engaged with the lower base 83 through the extension portion 84, which can achieve in a way that a snap-fit connector is arranged at the end of the extension portion 84, and a snap-fit groove associated with the snap-fit connector is formed in the lower base 83.

According to a preferred embodiment of the present disclosure, as shown in FIG. 12, the base 80 of the purifier may also be provided with another amusing assembly 85. When the pet interacts with the amusing assembly 85, because both the amusing assembly 85 and the second scratching portion 52 are located on the base 80 of the purifier, the pet may scrape off some hair or dander that is about to shed or has already shed but is still attached to the pet through the second scratching portion 52 during the interaction with the amusing assembly 85.

In particular, the amusing assembly 85 includes an annular track 851 formed on the base 80 of the purifier, especially the lower base 83, and a moving element (not shown) which is arranged in the annular track 851 and is movable. The pet may normally shift the moving element to let the moving element to move back and forth on the annular track 851, thus enhancing the interactivity with the pet. When the pet shifts the moving element in the annular track 851, it is possible to increase the probability of rubbing between the pet and the second scratching portion 52, thereby helping to better scrap off the floating hair of the pet.

Preferably, the moving element may be a rolling element. In other implementations, the moving element may be a sliding block.

More preferably, the moving element may be a colorful ball, and a plurality of balls are provided. The colors of all the balls may be set to be different to attract the pet to interact.

In this embodiment, the annular track 851 is formed on the lower base 83, the air vent 81 communicates with the annular track 851, the bottom of the upper base 82 cooperated with the annular track 851 to enclose and form an annular slot-shaped semi-open space, and the moving element is placed in the annular slot, allowing the moving element to be exposed for easy interaction while being confined in the annular track 851.

Preferably, at least two extension portions 84 are provided at intervals. By arranging the extension portions 84 at intervals, the pet may interact with the moving element in the annular track 851 at an interval position. Specifically, in this embodiment, three extension portions 84 are provided, and the three extension portions 84 are uniformly arranged at intervals along the periphery of the annular track 851.

Figure 13:
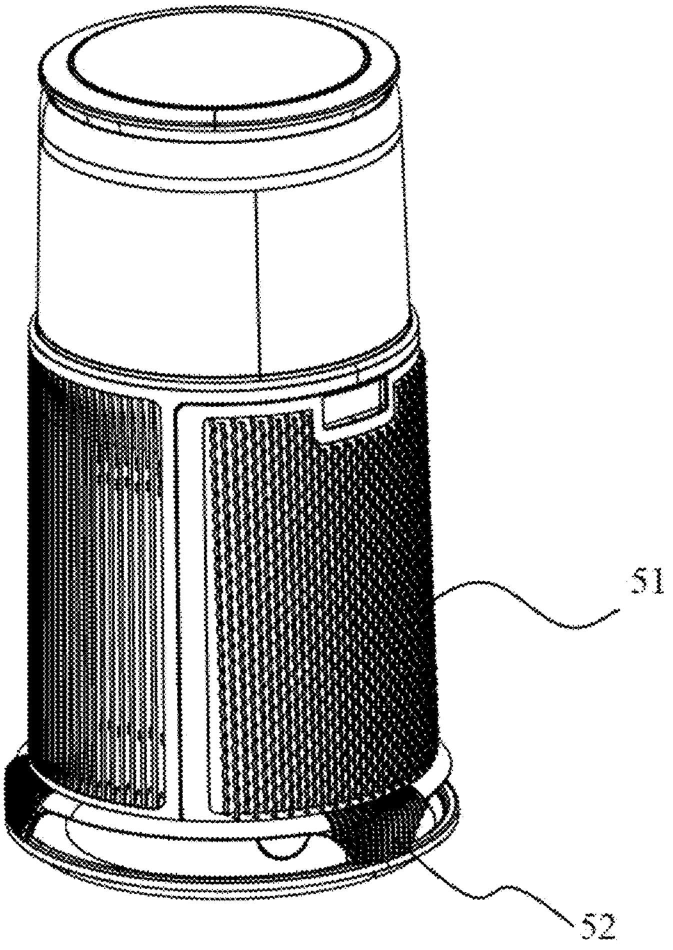
FIG. 13 is a perspective view of an air purifier according to an embodiment of the present disclosure, featuring a scratching portion with different distribution densities.

FIG. 13 shows an air purifier according to another embodiment of the present disclosure. In this embodiment, the distribution density and distribution area of the first scratching portion 51 arranged on the surrounding plate 212 are different from those of the air purifier shown in FIG. 10. Particularly, the raised lines of the first scratching portion 51 are denser in distribution and wider in distribution area. It is conceivable that in other embodiments, the distribution densities, lengths, distribution areas, etc. of all raised lines in the first scratching portion 51 and the second scratching portion 52 may be configured according to actual needs.

Figure 14:
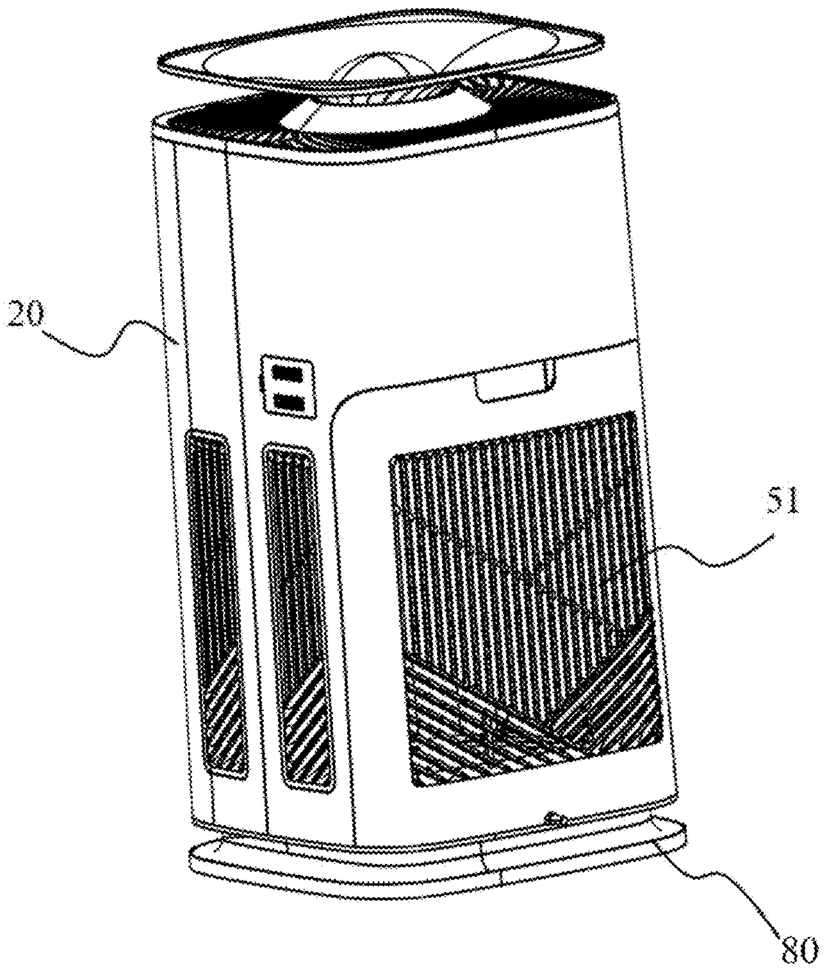
FIG. 14 is a perspective view of an air purifier according to an embodiment of the present disclosure, with only a purifier body being provided with a scratching portion.

FIG. 14 illustrates an air purifier according to another embodiment of the present disclosure. The air purifier in the embodiment is only provided with a scratching portion 51 at the purifier body 20. The scratching portion 51 may have the protruding structure or raised lines as described above.

Figure 15:
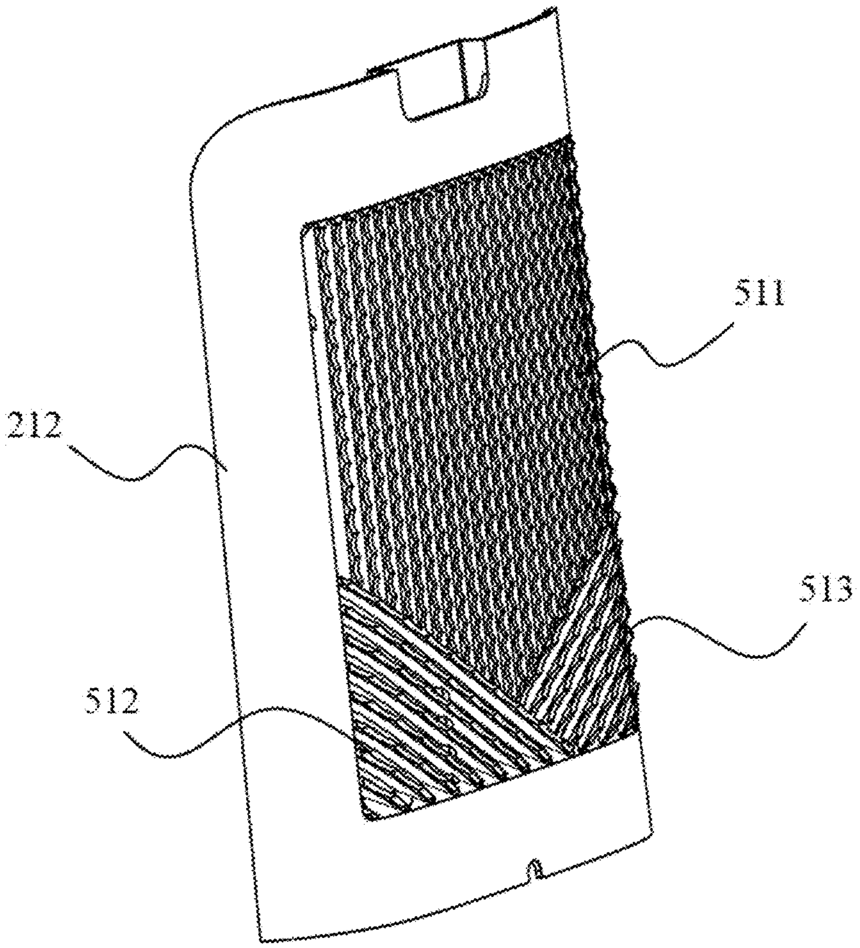
FIG. 15 is a schematic structural diagram of a surrounding plate of a purifier body according to an embodiment of the present disclosure.

FIG. 15 shows a surrounding plate 212 of the purifier body 20 according to a preferred embodiment of the present disclosure. In the embodiment, the first scratching portion 51 arranged on the surrounding plate 212 at least includes a plurality of first raised lines 511 arranged in parallel and a plurality of second raised lines 512 arranged in parallel, the first raised lines 511 and the second raised lines 512 being arranged at an included angle. Due to different orientations of the first raised lines 511 and the second raised lines 512, friction forces in different directions during scratching of the pet are applied, thereby enhancing the scratching effect. Meanwhile, the floating hair on the pet may be scraped off in different directions, which achieves better cleaning effect.

According to a more preferred embodiment, the first scratching portion 51 may further include a plurality of third raised lines 513 arranged in parallel. The first raised lines

511, the second raised lines 512 and the third raised lines 513 are arranged at an included angle in pairwise. It is conceivable that in other embodiments, more raised lines at different angles may also be arranged to enhance the scratching intensity of the pet, further attracting the pet to linger near the air purifier and cleaning pet hair in time.

In particular, as shown in FIG. 15, the plurality of first raised lines 511 arranged in parallel form a first scratching area, the plurality of second raised lines 512 arranged in parallel form a second scratching area, and the plurality of third raised lines 513 arranged in parallel form a third scratching area. Both the second scratching area and the third scratching area are provided below the first scratching area and are provided at both ends of the first scratching area respectively. Preferably, the first raised lines 511 are vertically arranged, and the second raised lines 512 and the third raised lines 513 are arranged in a V shape. Additionally, each scratching area may be separated by dividers to form different patterns, which can enhance the aesthetic appeal while attracting the pet to interact.

In other embodiments, the second scratching portion 52, as described above, may also be arranged on the base 10 of the air purifier shown in FIG. 14.

It should be noted that the amusing arrangements 10, the bases 10 and the scratching portions 51, 52 described in the above embodiments may be combined at random to form air purifiers with different structures.

Obviously, the above-mentioned embodiments of the present disclosure are only examples for clearly explaining the technical schemes of the present disclosure, and are not intended to limit the specific implementations of the present disclosure. Any modifications, equivalent substitutions and improvements made within the spirit and principle of the claims of present disclosure should be included in the protection scope of the claims of the present disclosure.

What is claimed is:

1. An air purifier, comprising a purifier body and an arrangement connected to the purifier body for interacting with a pet, wherein at least one hole is formed in the arrangement, the arrangement is provided with a driver and an assembly connected with the driver, wherein the driver is configured to drive the assembly to move and allow the assembly to extend out of or retract into the at least one hole, and wherein the arrangement comprises a bottom base and an upper cover, one end of the upper cover is connected to the bottom base and another end of the upper cover is connected to the purifier body, an upper end of the bottom base is closed by the upper cover, the driver and the assembly are arranged in a cavity defined by the bottom base and the upper cover, the at least one hole is formed at a side wall of the bottom base or the upper cover, and air vents communicated with the purifier body are formed at an upper portion of the upper cover for absorbing at least hairs of the pet around the arrangement.

2. The air purifier according to claim 1, wherein the assembly comprises a driving arm rotatably connected with the driver and a driven arm rotatably connected with the driving arm.

3. The air purifier according to claim 2, wherein at least the driven arm is an elastic arm.

4. The air purifier according to claim 2, wherein the assembly further comprises an element arranged at an end of the driven arm away from the driving arm, and the element is configured to extend out of or retracts into the hole by the driver.

5. The air purifier according to claim 4, wherein the element is detachably connected with the driven arm.

6. The air purifier according to claim 1, wherein a guide block for guiding movement of the assembly is further provided in the arrangement.

7. The air purifier according to claim 6, wherein at least two guide blocks are provided, two adjacent guide blocks form a guide slot, and the at least one hole is arranged corresponding to the guide slot.

8. The air purifier according to claim 1, wherein a plurality of holes are formed, which are circumferentially distributed along a periphery of the arrangement.

9. The air purifier according to claim 1, wherein the arrangement is arranged at a bottom portion or a top portion or at any position between the bottom portion and the top portion of the purifier body.

10. The air purifier according to claim 1, wherein the purifier body is provided with a scratching portion, the scratching portion being of a protruding structure.

11. The air purifier according to claim 1, further comprising a base for supporting the purifier body, the base is provided with an air vent communicated with both external air and the purifier body, and at least one of the base and the purifier body is provided with a scratching portion.

12. The air purifier according to claim 11, wherein the purifier body is provided with a first scratching portion, and the base is provided with a second scratching portion, the first scratching portion and the second scratching portion both being of protruding structures.

13. The air purifier according to claim 12, wherein the maximum protruding height of the first scratching portion is greater than that of the second scratching portion.

14. The air purifier according to claim 12, wherein the first scratching portion comprises a plurality of wavy raised lines or rack-shaped raised lines or columnar protrusions arranged in sequence.

15. The air purifier according to claim 12, wherein the second scratching portion comprises a plurality of smooth raised lines or wavy raised lines arranged in sequence.

16. The air purifier according to claim 12, wherein the purifier body comprises a housing and a filter screen arranged in the housing, the housing comprising a base frame and a surrounding plate detachably engaged with the base frame, and the first scratching portion being arranged on the surrounding plate.

17. The air purifier according to claim 12, wherein the base comprises an upper base and a lower base arranged below the upper base, the air vent being formed in the upper base, an extension portion extending to the lower base being formed at an outer edge of the upper base, and the second scratching portion being arranged on an outer wall of the extension portion.

18. The air purifier according to claim 11, wherein the scratching portion of the purifier body at least comprises a plurality of first raised lines arranged in parallel and a plurality of second raised lines arranged in parallel, the first raised lines and the second raised lines being arranged at an included angle.

19. The air purifier according to claim 18, wherein the scratching portion of the purifier body further comprises a plurality of third raised lines arranged in parallel, the first raised lines, the second raised lines and the third raised lines being arranged at an included angle in pairwise.

20. The air purifier according to claim 7, wherein a width of the guide slot formed by two adjacent guide blocks increasingly narrows in a direction pointing to the hole.

* * * * *